Jan. 31, 1956 L. FARNSWORTH 2,732,735
CENTERING AND DRILLING MACHINE
Filed May 3, 1954 3 Sheets-Sheet 1

INVENTOR.
LAWRENCE FARNSWORTH
BY
James E. Nilles
ATTORNEY

Jan. 31, 1956    L. FARNSWORTH    2,732,735
CENTERING AND DRILLING MACHINE
Filed May 3, 1954    3 Sheets-Sheet 2

INVENTOR.
LAWRENCE FARNSWORTH
BY James E. Niller
ATTORNEY

Jan. 31, 1956 L. FARNSWORTH 2,732,735
CENTERING AND DRILLING MACHINE
Filed May 3, 1954 3 Sheets-Sheet 3
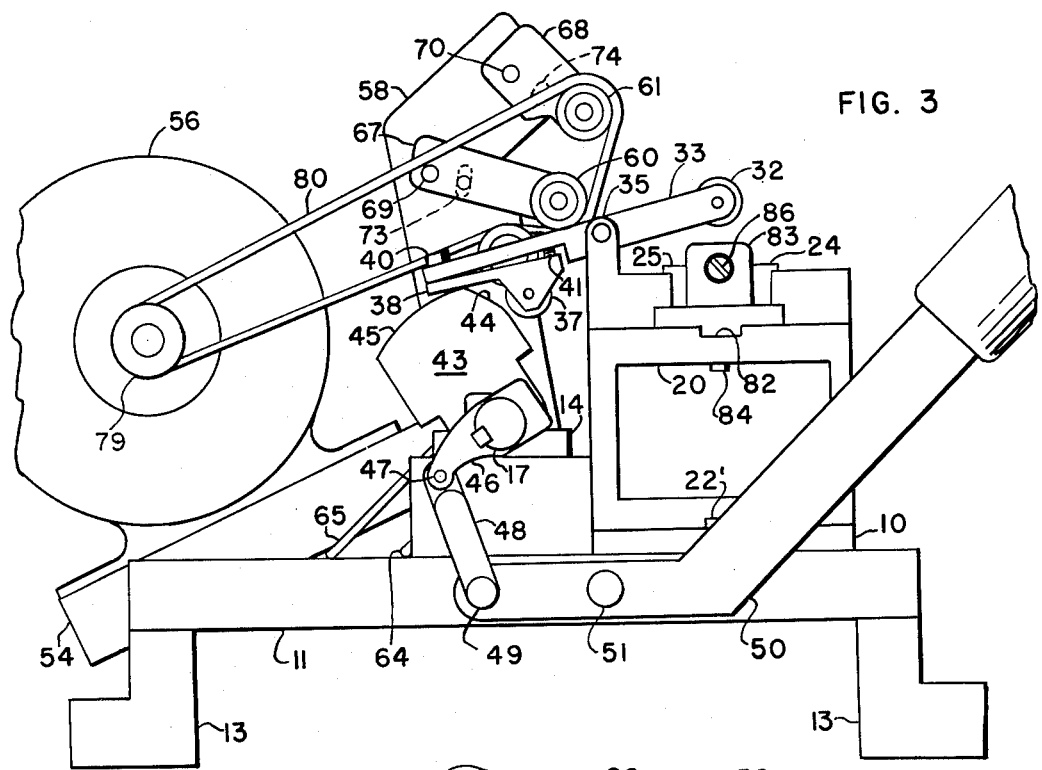
FIG. 3
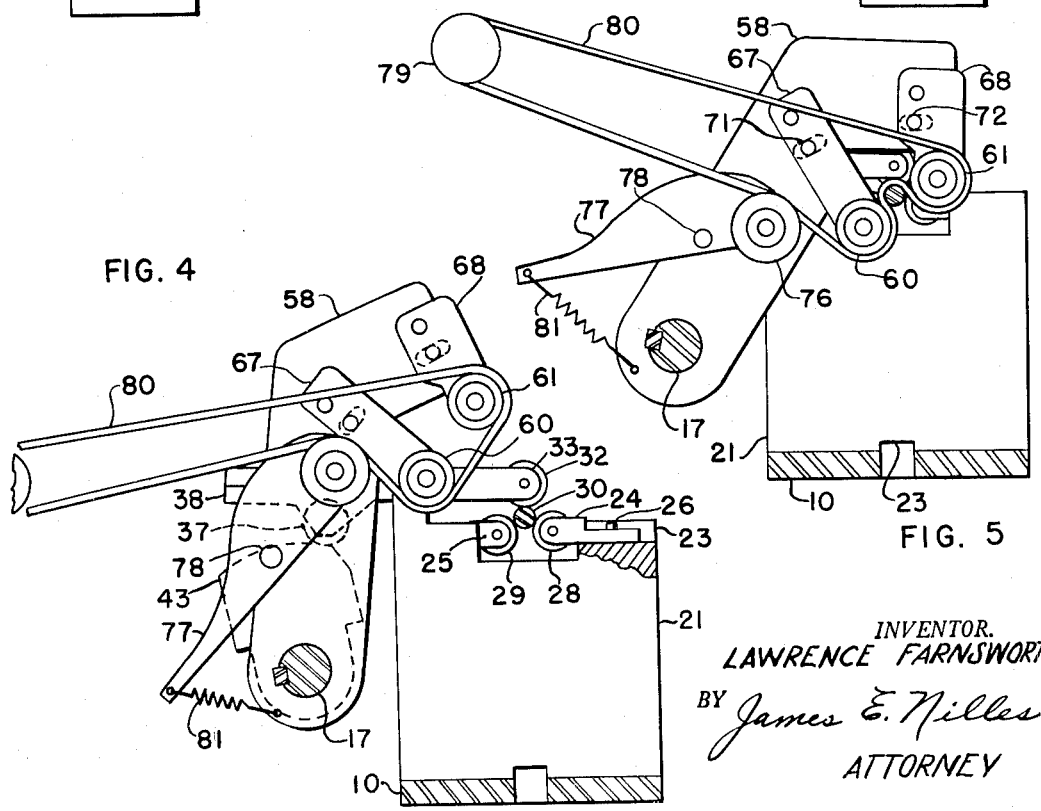
FIG. 4
FIG. 5
INVENTOR.
LAWRENCE FARNSWORTH
BY James E. Nilles
ATTORNEY

United States Patent Office 2,732,735
Patented Jan. 31, 1956

2,732,735

CENTERING AND DRILLING MACHINE

Lawrence Farnsworth, Racine, Wis., assignor of fifty per cent to Max Seft, Racine, Wis.

Application May 3, 1954, Serial No. 426,960

2 Claims. (Cl. 77—18)

This invention relates to centering and drilling machines and finds particular utility in machines for accurately locating centers of a shaft, or cylindrical workpiece. For instance, the exact centers of the workpiece can be located after the piece is completely finished on a lathe, or screw machine, for the purpose of locating the piece in a grinding machine or in a machine for cutting splines or gears.

An object of this invention is to provide an improved machine for quickly locating centers of a cylindrical workpiece within very close concentricity limits.

An object of this invention is to provide a machine, for accurately locating centers of a cylindrical workpiece, having novel means for rotating the piece during operation.

An object of this invention is to provide a centering machine, having novel means for accurately and positively holding a workpiece in position and allowing it to be rotated freely while being worked upon.

A more specific object of the invention is to provide a centering machine, having novel means for positively clamping the piece in position, yet allowing it to rotate freely and also having novel means for rotating the piece during the centering or drilling operation; both said means having a common actuating means.

It is still another object of this invention to provide a centering machine in which the workpiece is quickly loaded and unloaded and which is highly accurate and efficient in carrying out the functions for which it was designed.

It is a general object of this invention to provide a very efficient, high speed centering and drilling machine which substantially reduces breakage of the tools and which virtually eliminates scrapping of the workpieces due to failure to hold them within the required tolerances.

Other objects and advantages of this invention will become more apparent as this disclosure progresses, reference being had to the accompanying drawings wherein one form of the invention is clearly illustrated in which:

Figure 3 is an elevational end view of the machine shown in Figures 1 and 2.

Figure 4 is a partial sectional view taken on line 4—4 of Figure 1 showing the holding means in an operative position and the driving means in the inoperative position.

Figure 5 is a partial sectional view taken on line 4—4 of Figure 2 showing the holding and driving means in the operative position.

Main frame

Figure 1:
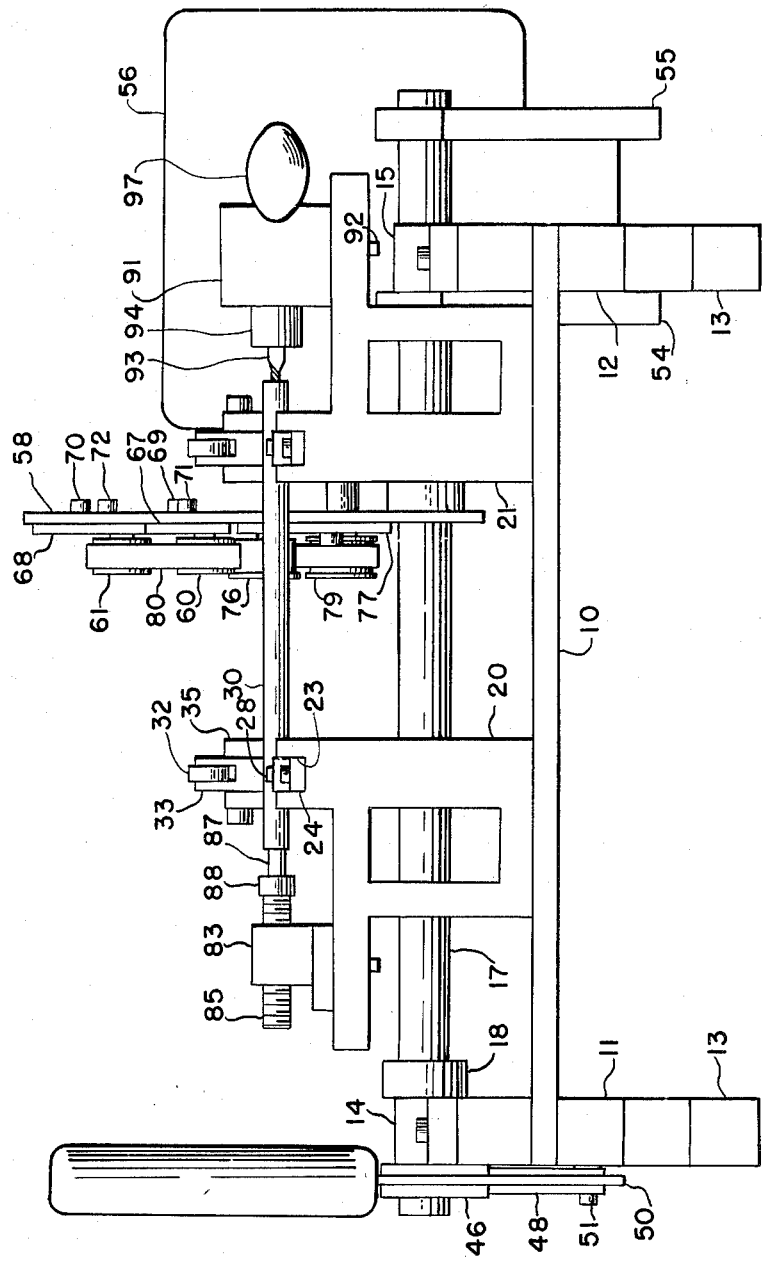
Figure 1 is a front elevational view of the machine showing the holding and the driving means in an operative position.

Referring more particularly to the drawings, the main frame of the machine comprises a bed plate 10 secured to transverse frame members 11, 12 which are mounted on four legs 13. Bearing blocks 14, 15 are rigidly secured to transverse members 11, 12 and rotatably support the actuating shaft 17. A collar 18 prevents axial displacement of shaft 17 in one direction.

Holding means

A main support structure is comprised of a left and right table 20, 21 respectively, which are adjustably secured in the longitudinal slot 22 of bed plate 10 by bolt and nut means (not shown). Rectangular guide keys fit in slot 22 and in corresponding slots 22' of tables 20, 21 for insuring alignment of the tables relative to the bed 10 and for facilitating their adjustment along the length of the bed. The support roller holding unit for each table 20, 21 are identical and will be described with reference to table 20, it being understood that a similar unit is employed on table 21. Rectangular guide ways 23 extend transversely of the tables and receive roller holders 23, 25 which are adjustably secured therein by means of threaded cap screws 26 extending through slots 27 of the holders 24, 25 and threadably engaged in tapped holes in the bottom of guide ways 23. On the inner ends of the opposed holders 24, 25 are rotatably mounted the opposed rollers 28, 29. In practice, it has been found very effective to provide ball bearing type rollers for the high speeds employed in certain operations of this machine. The workpiece 30 is held against the opposed rollers 28, 29 by the third roller 32 which is rotatably mounted on one end of arm 33. Arm 33 is oscillatingly mounted intermediate its length on an upstanding portion 35 of the table 20. The other end of arm 33 carries a cam follower 37 on an adjustable member 38, best shown in Figure 3. The shank of cap screw 40 extends freely through a hole in the rear end of arm 33 and is threadably engaged with a tapped hole in member 38. The purpose and nature of this adjustment will appear more fully hereinafter.

The means for shifting roller 32 into holding engagement with the workpiece takes the form, in the embodiment of the invention shown, of a cam 43. Cam follower roller 37 bears against cam 43, which is secured to shaft 17, and rotates therewith. Cam 43 has a positioning cam surface 44 and a holding surface 45 which is formed on an arc having the axis of shaft 17 as a center.

Actuating means

The actuating means, chosen for illustrative purposes, for cam 43 comprises a shaft 17 to the end of which is secured a lever 46 having a bifurcated end which is pivotally attached at 47 to one end of link 48. Lever 46, together with collar 18, serves to prevent axial displacement of shaft 17. The other end of link 48 is pivotally attached at 49 to a manually operated holding and driving lever 50 which is pivotally attached to the main frame at 51. As viewed in Figure 3, when the lever 50 is rotated in a clockwise direction about point 51, point 49 passes over dead-center in regard to points 47 and 51. This over-center lock arrangement could be operated by a foot pedal as well without departing from the scope of the invention. Such movement rotates shaft 17 and cam 43 in a clockwise direction and finally locks the cam in operative position as point 49 goes over dead center. During the initial movement of lever 50, the follower 37 bears against the positioning surface 44 of cam 43 and shifts roller 32 into holding engagement with the workpiece 30 when the follower 37 engages surface 45. During the second phase of cam movement, i. e., upon continued rotation of the lever 50 and cam 43, the roller rides on the holding surface 45 and maintains roller 32 in holding position with the workpiece 30 as shown in Figure 4. It is during this second phase of movement of shaft 17 and cam 43 that the driving means for the workpiece, which is presently to be described, comes int operation. The actuating means is common, therefore, to both the holding and driving means and both are engaged and disengaged in the proper sequence by a simple movement of the actuating lever.

Driving means

Figure 2:
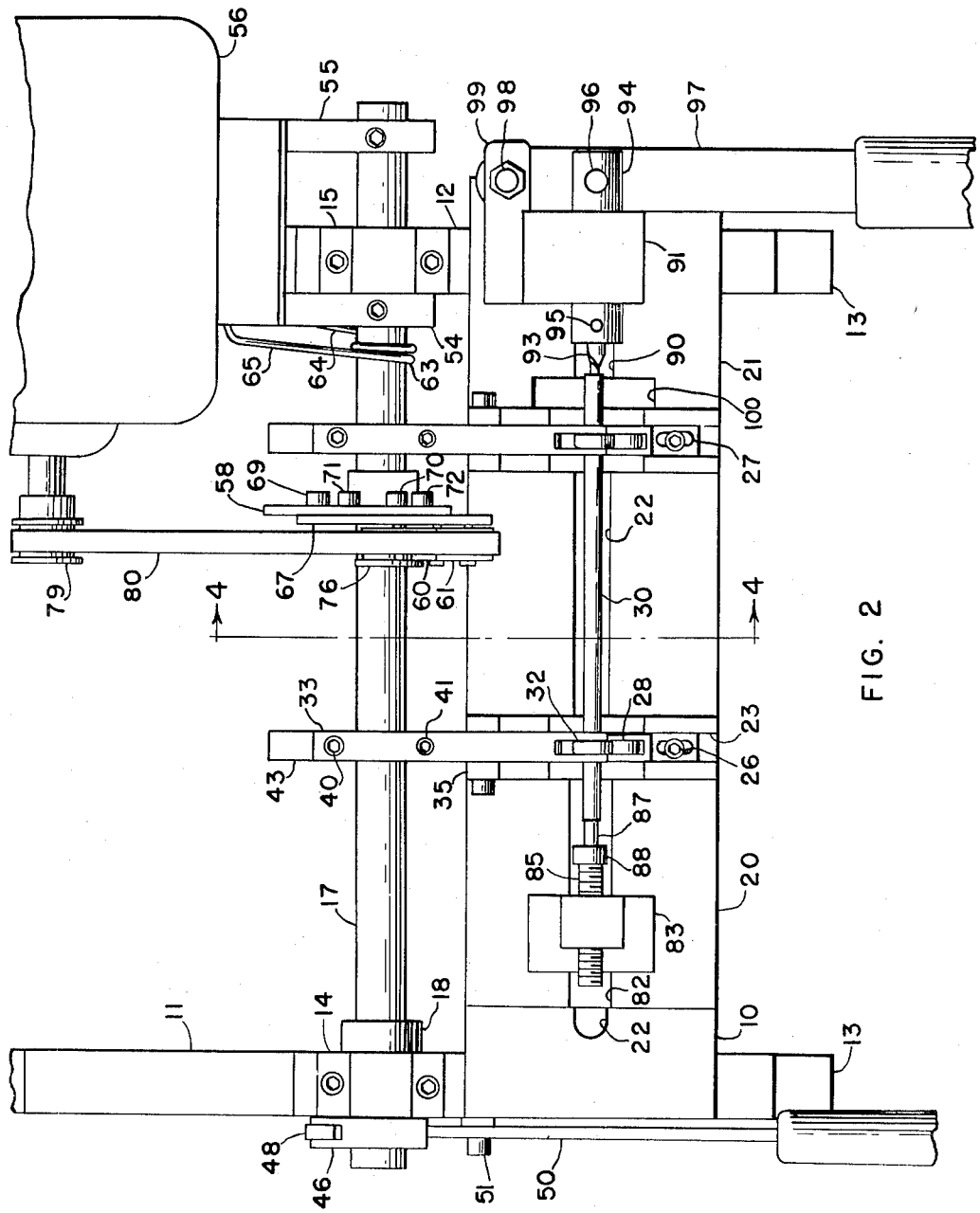
Figure 2 is a plan view of the machine shown in Figure 1.

Brackets 54, 55 which support electric motor 56 are rigidly secured to shaft 17. Drive support member 58, which supports the driven sheaves 60, 61, is also rigidly secured to shaft 17. The motor 56 and drive support member 58 are thus rotated with shaft 17 as an integral unit by the lever 50. A spring 63, shown in Figures 2 and 3, is coiled around shaft 17 and has one leg 64 which bears against the main frame and another leg 65 which bears against the motor bracket 54 to urge it in a clockwise direction to thereby permit easier rotation of shaft 17. Sheaves 60, 61 are rotatably mounted on support 58 in spaced relation by brackets 67, 68 respectively, which in turn are adjustably secured to support member 58 by cap screws 69, 70 respectively and by cap screws 71, 72 which extend through arcuate slots 73, 74 in brackets 67, 68 respectively. This adjustment is to accommodate different diameter workpieces. A belt tightener pulley 76 is rotatably mounted on arm 77 which is pivotally mounted intermediate its length at 78 to support member 58. The motor 56 has a pulley 79 which forms the driver means in this embodiment of the invention. Pulley 76 is yieldingly urged against the belt 80, which is trained around sheaves 60, 61 and motor pulley 79, by action of the spring 81 secured at one end to support member 58 and at the other end to arm 77. As illustrated in Figure 5, when the belt is in operative or driving position, the spring 81 is elongated and the pulley 76 is biased against the belt 80 to maintain proper tension thereof. In the driving position, sheaves 60 and 61 are extended past the workpiece to such an extent that belt 80 wraps around a substantial portion of the periphery of the workpiece to insure a positive drive and prevent the tool 93 from stopping the rotation of the piece.

Depth adjustment

Table 20 has a longitudinally arranged groove 82 in which is slidably and adjustably secured a tailstock 83. A cap screw 84 (Figure 3) is threadably engaged in tailstock 83 and extends through a longitudinal slot (not shown) in the bottom of groove 82. An adjusting screw 85 having an adjusting slot 86 in the end is threadably engaged with tailstock 83. A stop member 87 is rotatably mounted in an enlarged portion 88 of screw 85 containing a thrust bearing which absorbs the thrust of the workpiece 30 due to the axial pressure imposed thereon by the tool 93.

Tool feeding means

Table 21 also has a longitudinally arranged groove 90 (Figure 2) in which is slidably and adjustably secured the headstock 91 by means of a cap screw 92 accessible from beneath table 21. A tool 93, such as a drill or center, is secured in tool holder 94 by a set screw 95 (Figure 2). Tool holder 94 slidably extends through a close fitting bore in headstock 91 and is pivotally secured at 96 to the feed lever 97 which is pivoted at 98 to member 99 secured to the headstock 91. An opening 100 in table 21 provides for chip clearance.

Operation

The procedure for operating the machine is as follows. The feed lever 97 is swung to the extreme right thus removing the tool holder 94 from the headstock. A cylindrical guide or gauge (not shown) which forms a close fit with the bore in the headstock is inserted therein. The guide or gauge cylinder has a bore therethrough which is the same size as the piece 30 to be worked. The piece 30 is then inserted in the bore of the guide and the pair of rollers 24, 25 nearest the tailstock are then brought into contact with the piece and locked in position. The pair of rollers 24, 25 nearest the headstock are then brought into contact with the piece 30 and then locked in position. The third rollers 32 are brought down until they engage the workpiece. The set screws 41 are then adjusted so the cam followers 37 bear against the cam surfaces 45. The screws 40 are then tightened, locking the cam followers 37 relative to arms 33. The guide cylinder is then replaced by the tool holder 94. The headstock 91 is adjustable relative to the table 21, as mentioned, in order that the roller holders engage the piece in a level location along its length, i. e., not on a shoulder of the piece or a place of varying diameter. As the tool is being fed into the workpiece, the feed lever 97 will come to bear against the headstock 91 thus preventing further penetration of the tool. The tailstock is adjustable along table 20 for accommodating pieces of various length. The adjusting screw 85 in the tailstock is for determining the depth of penetration of the tool.

With the lateral rollers 28, 29, the third roller 32, the headstock and tailstock thus adjusted, the driving means is ready to be brought into contact with the piece. The lever 50 is pushed downwardly thus rotating shaft 17 and cam 43 in a clockwise direction. As previously explained, the cam surface 44 causes the roller follower 37 to shift roller 32 toward the piece. As the follower 37 reaches surface 45, the roller 32 bears against piece in holding relation. The amount of force of roller 32 on the piece is sufficient to hold it firmly in place yet not so tight so as to prevent it from rotating freely. Continued rotation of the shaft 17 causes the support member 58 to rotate clockwise over the piece. In operation the sheaves 60, 61 assume the position shown in Figure 5 in relation to the workpiece. The belt 80 contacts a substantial portion of the periphery of the piece so as to insure a positive drive thereof.

With his other hand the operator then swings feed lever 97 to the left as viewed in Figure 2, thus bringing the tool into engagement with the piece. An exact predetermined depth is obtained when the lever 97 abuts against headstock 91. After the tool is withdrawn by swinging lever 97 to the right, the handle of the lever 50 is swung upwardly and the driving means and holding means both disengaged from the piece, the piece is then simply reversed, end for end, and the holding and driving means again quickly engaged by swinging lever 50 downwardly. The piece is then again ready for the tool.

Summary

This machine has found particular utility in centering and drilling small shafts such as are employed in small electric motors. The tolerances of such shafts are of necessity very close and it is extremely important to hold the concentricity of the centers of such shafts within very close limits.

The procedure in making a workpiece would be to first completely finish it on a screw machine, i. e., turn it down to final size. The centering, and drilling if desired, would then be done on the present machine in preparation for the final operation, such as cutting in splines and gears. If a final grinding operation is desired, then it is necessary to leave only enough material on the piece, on the first turning operation, for this final grinding.

In conventional practice, it is necessary to first center the piece, then rough turn on the screw machine and then finish turn in order to secure the desired concentricity. Even under this practice there occurs considerable distortion of the ends of the centers so formed because of the poor concentricity. Furthermore, with the present machine the extra turning operation is eliminated.

By rotating the workpiece and maintaining the tool stationary, concentricity of the center is assured. By using this driving means, a chuck for holding the piece is unnecessary and very high speeds, in some cases over 6000 R. P. M., are attainable. In operating this machine the use of drills of a diameter of only 28 thousandths is not unusual. Centering drills of the "A-1" size have been used to produce centers at the rate of 500 centers per hour and held to a tolerance of within 2 thousandths of an inch center depth. It can be appreciated, by those skilled in this art, that by maintaining exact concentricity and high speeds, the life of the tool will be materially increased, in fact breakage of these tools has been substantially eliminated. Furthermore distortion of the hole, or center, being formed, that is, flaring or improper chamfer angle, is eliminated and scrappage of workpieces greatly reduced. Furthermore, the loading, operational and unloading time of the subject machine is very short. In practice it has been found the time required to finish certain pieces has been reduced as much as one-quarter of that required by conventional methods.

Having thus shown and described a preferred embodiment of the invention, what is desired to be secured by Letters Patent is:

1. A centering machine for a cylindrical workpiece comprising a support structure, a pair of holding units longitudinally spaced along said structure and each unit comprising, opposed rollers secured to said structure and adjustable in a transverse direction in order to accommodate workpieces of varying diameter, and rotatably supporting said workpiece, a feedable tool mounted on said support structure in axial alignment with said workpiece, an arm oscillatingly mounted on said structure and having a third roller rotatably mounted thereon and shiftable into and out of holding engagement with said workpiece, means engageable with said arm to shift said third roller into or out of holding engagement with said workpiece; actuating means shiftably mounted on said machine for shifting said means into and out of holding position; a support member having a pair of spaced sheaves rotatably mounted thereon, a flexible belt trained around said sheaves and adapted to engage a substantial portion of the periphery of the workpiece in the driving position so as to rotate the latter, said support member being shiftable into and out of belt driving position with respect to the workpiece by said actuating means, said sheaves extending adjacent opposite sides of said workpiece when in driving position, and means to drive said belt.

2. A centering machine for a cylindrical workpiece comprising, a support structure, a feedable tool mounted on said structure for engaging an end of said workpiece; a pair of holding units longitudinally spaced along said structure and each unit comprising, opposed rollers rigidly secured to said structure and adjustable in a transverse direction so as to accommodate workpieces of various diameters and axially align said workpieces with said tool, said holders supporting said workpiece for free rotation thereon, an arm shiftably mounted on said structure and having a third roller shiftable into and out of holding engagement with said workpiece; actuating means mounted on said support structure, cam means secured to said actuating means and engageable with said arms for shifting the latter into and out of workpiece holding position; a drive support member rigidly mounted on said actuating means having a driver pulley and a pair of driven sheaves mounted thereon, a flexible belt around said pulley and sheaves, said support member being oscillatable between an inoperative and a workpiece driving position upon oscillation of said actuating means whereby said sheaves cause said belt to wrap around a portion of said workpiece in the driving position.

References Cited in the file of this patent

UNITED STATES PATENTS

| | | |
|---|---|---|
| 537,490 | Slater | Apr. 16, 1895 |
| 566,122 | Ashton | Aug. 18, 1896 |
| 975,088 | Thompson | Nov. 8, 1910 |
| 1,007,412 | Acker | Oct. 31, 1911 |
| 1,082,544 | Matheus | Dec. 30, 1913 |
| 1,776,241 | Caster et al. | Sept. 16, 1930 |
| 1,954,920 | Damerell | Apr. 17, 1934 |
| 2,363,448 | Siesel | Nov. 21, 1944 |
| 2,464,662 | Young | Mar. 15, 1949 |